United States Patent [19]

Omura et al.

[11] Patent Number: 4,628,768

[45] Date of Patent: Dec. 16, 1986

[54] TRACTOR TRANSMISSION

[75] Inventors: Takaho Omura, Izumisano; Yasuyuki Horii, Sakai; Taichi Fujiwara, Izumi; Masaru Nakata, Sakai, all of Japan

[73] Assignee: Kubota, Ltd., Osaka, Japan

[21] Appl. No.: 822,692

[22] Filed: Jan. 24, 1986

Related U.S. Application Data

[63] Continuation of Ser. No. 493,475, May 11, 1983, abandoned.

[30] Foreign Application Priority Data

May 21, 1982 [JP]   Japan ............................ 57-75151[U]

[51] Int. Cl.[4] ............................................. F16H 3/02
[52] U.S. Cl. ....................................... 74/745; 74/329; 74/360; 74/606 R
[58] Field of Search ................. 74/360, 745, 329, 331, 74/606 R

[56] References Cited

U.S. PATENT DOCUMENTS

| 2,881,627 | 4/1959 | Hubert et al. | 74/745 X |
| 2,975,656 | 3/1961 | Haverlender | 74/745 |
| 4,060,005 | 11/1977 | Bost | 74/745 |
| 4,282,775 | 8/1981 | Van Dest | 74/360 X |
| 4,326,597 | 4/1982 | Murayama et al. | 74/745 X |
| 4,484,488 | 11/1984 | Kato et al. | 74/360 X |

FOREIGN PATENT DOCUMENTS

| 57-01847 | 1/1982 | Japan | 74/745 |
| 57-51052 | 3/1982 | Japan | 74/360 |
| 2063395 | 6/1981 | United Kingdom | 74/745 |

Primary Examiner—Kenneth J. Dorner
Assistant Examiner—Joseph M. Rolnicki
Attorney, Agent, or Firm—Edwin E. Greigg

[57] ABSTRACT

A tractor transmission wherein an engine output is transmitted through a clutch mechanism to a primary change speed mechanism, and a clutch housing and a first transmission case are removably connected to each other. The first transmission case includes a space in a forward portion thereof to accommodate a high speed and low speed switching mechanism and a forward and backward switching mechanism, interchangeable with each other, to be attached to a rear wall of the clutch housing.

4 Claims, 8 Drawing Figures

TRACTOR TRANSMISSION

This is a continuation of copending application Ser. No. 493,475 filed May 11, 1983 now abandoned.

BACKGROUND OF THE INVENTION (1) Field of the Invention

This invention relates to an improvement in a tractor transmission.

(2) Description of the Prior Art

Unlike a passenger car, a tractor requires a transmission providing a multistep change speed at great reduction ratios in order to carry out varied operations. There is a known tractor transmission which includes a backward and forward switching mechanism or so-called shuttle transmission mounted forwardly of a primary change speed mechanism to suit, for example, a loading and unloading operation which involves a frequent repetition of backward and forward movements. Such a transmission has a disadvantage of having to change a wheelbase when, for example, a secondary change speed mechanism mounted rearwardly of the primary change speed mechanism and providing two speeds is modified or replaced with a new mechanism to provide three speeds.

Where a high speed and low speed switching mechanism is mounted forwardly of the primary change speed mechanism, it is sufficient that the secondary change speed mechanism provides two forward speeds and one backward speed. But in this instance the primary change speed mechanism must incorporate the backward and forward switching mechanism, which results in complicated construction and necessitates a change of the wheelbase.

SUMMARY OF THE INVENTION

An object of this invention is to provide a tractor transmission which accommodates the high speed and low speed switching mechanism and the backward and forward switching mechanism without necessitating any changes to the primary change speed mechanism and the wheelbase.

In order to achieve the above object this invention provides a tractor transmission permitting an output of an engine to be transmitted to a primary change speed mechanism housed in a first transmission case through a clutch mechansim in a clutch housing, the first transmission case being removably attached to a rear wall of the clutch housing, wherein the first transmission case includes a space in a forward portion thereof for accommodating a backward and forward switching mechanism and a high speed and low speed switching mechanism, interchangeable with each other, removably attached to the rear wall of the clutch housing facing the space to transmit the output of the engine to the primary change speed mechanism.

Thus, the transmission according to this invention is capable of accommodating the high speed and low speed switching mechanism and the backward and forward switching mechanism (or shuttle transmission), interchangeable with each other and attached to the rear wall of the clutch housing, in the space defined forwardly of the primary change speed mechanism, without changing the wheelbase of the tractor.

The invention, therefore, enables a tractor to be manufactured at low cost, which is movable back and forth at varied speeds to carry out many different operations efficiently.

Other objects and advantages of this invention will be apparent from the following description.

BRIEF DESCRIPTION OF THE DRAWINGS

The drawings show embodiments of this invention, in which.

DESCRIPTION OF THE PREFERRED EMBODIMENT

Figure 1:
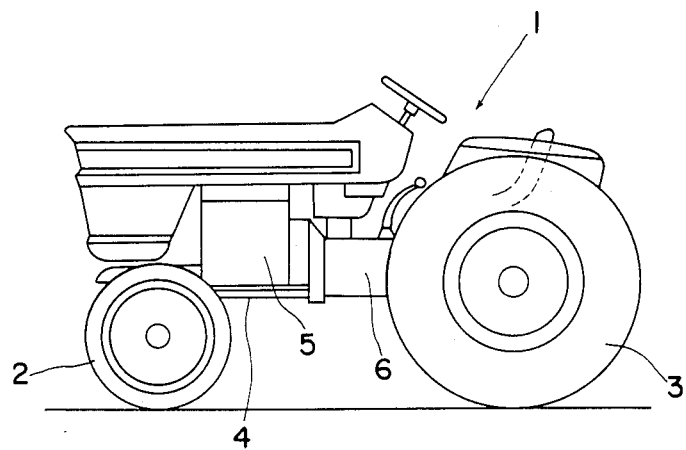
FIG. 1 is a side view of a tractor.

FIG. 1 shows a four-wheeled tractor 1 having a right and left pair of front wheels 2 and a right and left pair of rear wheels 3. The front wheels 2 in this example are dirigible wheels and at the same time drive wheels which are driven by a propeller shaft 4 in timed or synchronous relationship with the rear wheels 3.

Number 5 denotes an engine operatively connected to the rear wheels 3 and a power takeoff shaft through a clutch mechanism and change speed mechanisms housed in a frame 6 connected to a rear face of the engine.

Figure 2:
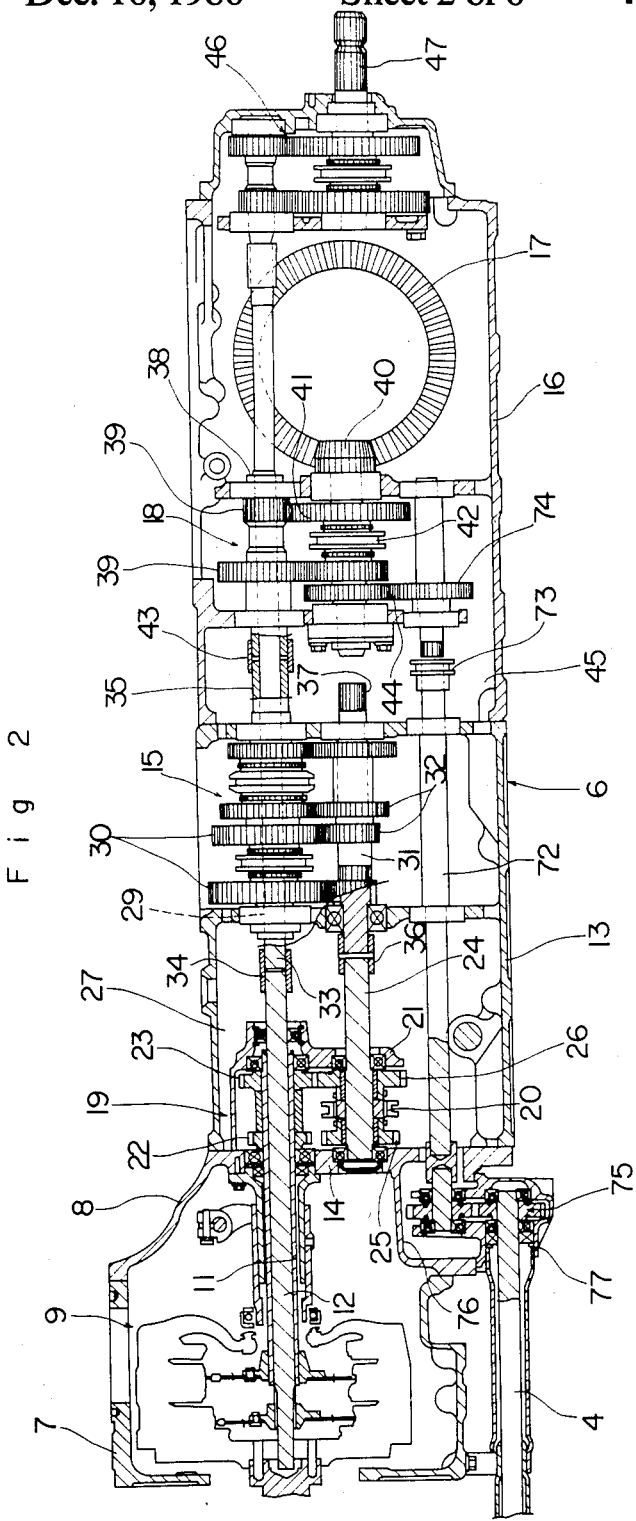
FIG. 2 is a sectional side view of an example of the transmission.

Referring to FIG. 2 showing an interior of the frame 6, a flywheel housing 7 is secured to the rear face of the engine by bolts (not shown), and a clutch housing 8 is secured to the flywheel housing 7 by bolts (not shown). The two housings contain the clutch mechanism 9 which is put in and out by a clutch release mechanism 10 to connect and disconnect a drive propeller shaft 11 and a power takeoff propeller shaft 12, respectively. In this example the propeller shaft 11 is a sleeve shaft containing the propeller shaft 12. The clutch mechanism 9 is a two-step depression type double clutch.

Number 13 denotes a first transmission case removably attached at a forward end thereof to a partition wall 14 of the clutch housing 8 by bolts or the like (not shown). The first transmission case 13 contains, in this embodiment, a primary change speed mechanism 15 having gears in constant mesh and providing four speeds.

Number 16 denotes a second transmission case containing a secondary change speed mechanism 18 operatively connected to a differential 17. The second transmission case 16 is removably attached at a forward end thereof to the first transmission case 13 by bolts or the like (not shown) to permit operative connection between the primary change speed mechanism 15 and the secondary change speed mechanism 18. Thus, in this example, the frame 6 consists of the flywheel housing, the clutch housing and the first and second transmission cases.

Number 19 denotes a backward and forward switching mechanism or shuttle transmission mechanism including a backward and forward switching shifter 20.

Figure 3:
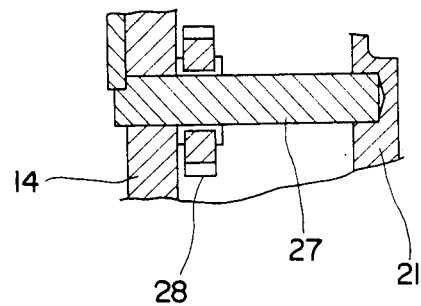
FIG. 3 is a sectional view of a shuttle portion of FIG. 2.

This mechanism 19 is supported by a casing 21 and removably attached to the partition wall 14 by bolts or the like (not shown) according to this embodiment. The switching mechanism 19 includes gears 22 and 23 removably splined to or otherwise mounted on the propeller shaft 11, and gears 25 and 26 rotatably mounted on an output shaft 24 supported by the casing 21. The gears 22 and 25 are operatively connected to each other by an idle gear 28 supported by a shaft 27 as shown in FIG. 3, and the gears 23 and 26 are directly connected to each other. The output shaft 24 is rotatable in opposite directions by sliding the shifter 20.

The casing 21 is mounted in the first transmission case 13 forwardly of the primary change speed mechanism 15, and for this purpose a space 27 is provided in the forward portion of the first transmission case 13. While in this embodiment the casing 21 is attached to the partition wall 14, the casing 21 may be attached to the first transmission case 13 so long as it is disposed in the space 27.

The primary change speed mechanism 15 comprises a plurality of change speed gears 30 having varied diameters and rotatably mounted on a tubular change speed shaft 29 supported through bearings by upper wall portions of the first transmission case 13, and a plurality of change speed gears 32 mounted on an input shaft 31 supported through bearings below the change speed shaft 29, the gears 31 being shiftable into and out of engagement with the gears 32 opposed thereto. The change speed shaft 29 contains therein a power takeoff transmission shaft 33 which is connected to the propeller shaft 12 by a coupler 34. The change speed shaft 29 has a rear portion 35 extending through a rear wall of the first transmission case and including a stepped portion.

The input shaft 31 is connected at a forward end thereof to the output shaft 24 of the switching mechanism 19 by a coupler 36 and has a rear portion 37 projecting from the rear wall of the first transmission case 13 and defining a spline thereon.

The secondary change speed mechanism 18 comprises a plurality of, or in this embodiment, of change speed gears 39 having varied diameters and fixedly mounted on a tubular change speed shaft 38 supported by upper portions of the second transmission case 16, and a plurality of gears 41 having varied diameters and rotatably mounted on a drive pinion shaft 40 entending below and parallel to the change speed shaft 38, the gears 41 being brought into and out of engagement with the gears 39 by sliding a shifter 42 to provide two speeds. The drive pinion shaft 40 is operatively connected to the differential 17. The change speed shaft 38 is coaxial with and connected by a coupler 43 to the change speed shaft 29 of the primary change speed mechanism. The drive pinion shaft 40 is coaxial with the input shaft of the primary change speed mechanism, and carries a front wheel drive gear 44 fixed thereto.

The second transmission 16 housing the secondary change speed mechanism 18 includes a space 45 in a forward portion thereof. The power takeoff transmission shaft 33 extends through the interior of the change speed shaft 39 to be operatively connected to a power takeoff shaft 47 via a power take-off change speed mechanism 46 housed in a rear portion of the second transmission case 16.

The transmission shown in FIG. 2 includes the shuttle transmission mechaism mounted in the space 27 forwardly of the primary change speed mechanism 15 to be suitable for a loading and unloading operation or the like which involves a frequent repetition of to and fro movements. This transmission of FIG. 2 permits the secondary change speed mechanism 18 to be modified to provide three speeds by using a longitudinal allowance provided by the space 45 in the forward portion of the second transmission case 16. Such a modification requires no change to be made to the primary change speed mechansim 15 or to the cases and housings.

Figure 4:
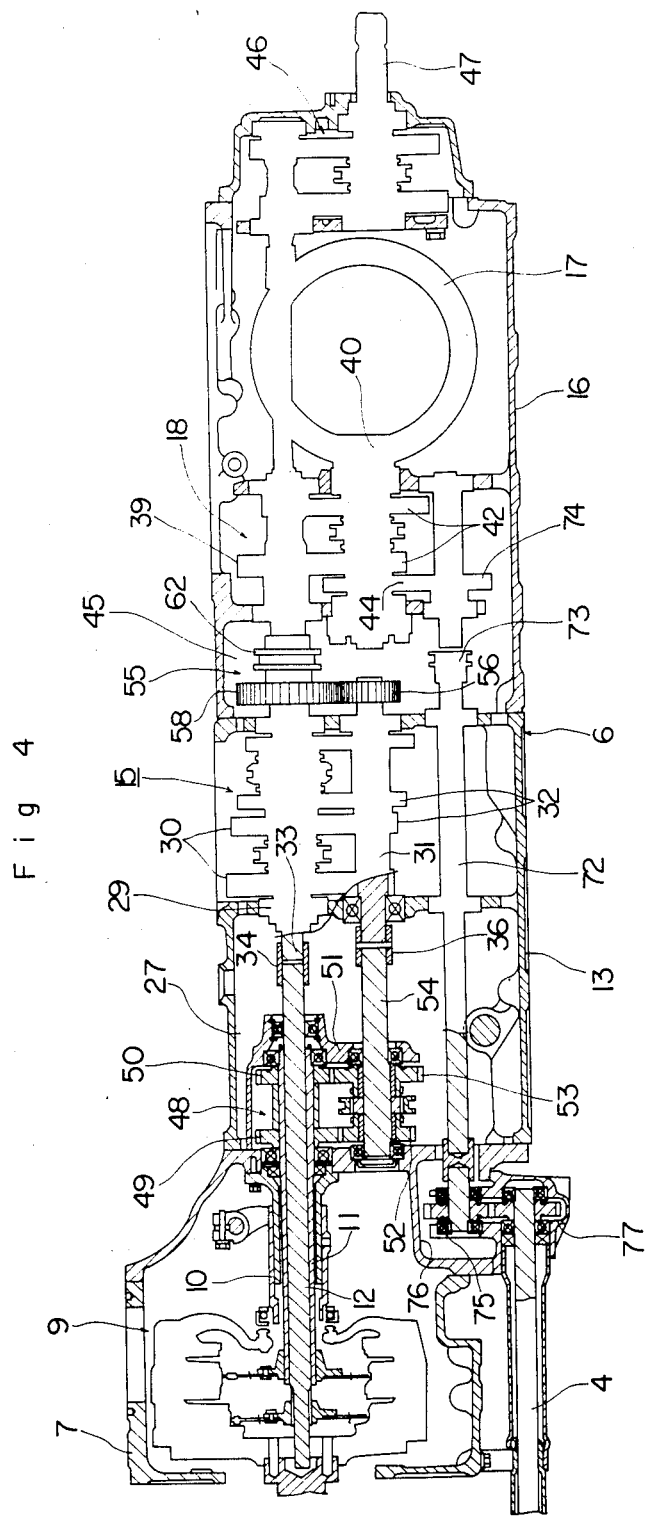
FIG. 4 is a sectional side view of another example of transmission.

FIG. 4 shows an embodiment in which the described shuttle transmission mounted in the space 27 is replaced by a so-called high and low transmission mechanism 48 which switches between a high speed and a low speed.

More particularly, referring to FIG. 4, different diameters gears 49 and 50 are splined to the propeller shaft 11, and a high speed and a low speed gears 52 and 53 are mounted on an output shaft 54 supported by a casing 51 to be brought into and out of engagement with the gears 49 and 50 by a shifter so as to switch between the high speed and low speed. The output shaft 54 is operatively connected to the input shaft of the primary change speed mechanism.

To assemble these transmission mechanisms, the clutch housing and the first transmission case are disjoined from each other, the casings 21 and 51 containing the respective transmission mechanisms are selectively attached to the rear face of the partition wall 14, and the first transmission case 13 is fitted forwardly to be secured to the partition wall 14 by bolts (not shown).

Where the high speed and low speed switching mechanism 48 is mounted forwardly of the primary change speed mechanism 15, it is sufficient that the secondary change speed mechanism provides two forward speeds and one backward speed. But, if a reversing mechanism is incorporated into the primary change speed mechanism 15, the latter loses the advantage of being usable with the backward and forward switching mechanism.

Thus the reversing mechanism 55 is removably mounted in the forward space 45 of the second transmission case 16, that is between an output side of the primary change speed mechanism and an input side of the secondary change speed mechanism, as shown in FIG. 4.

Figure 5:
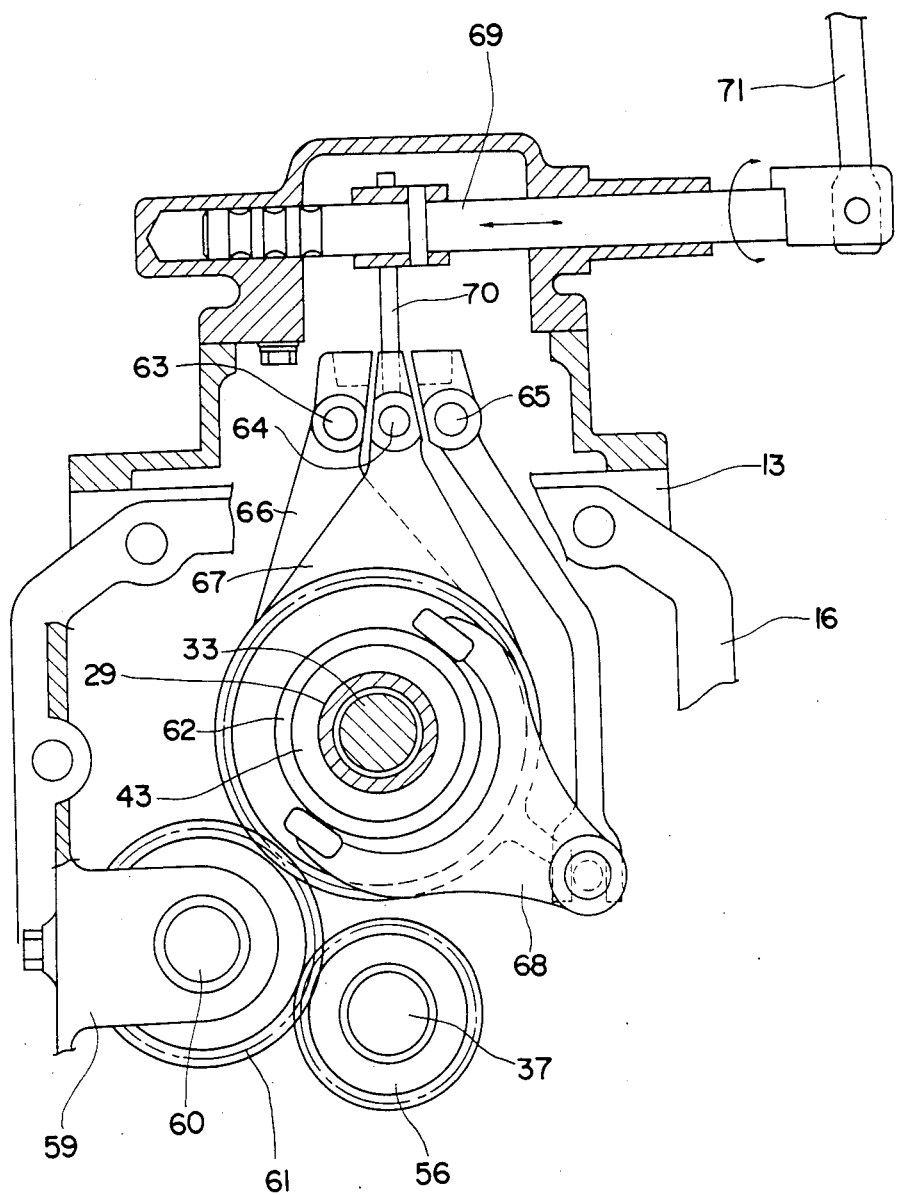
FIG. 5 is an enlarged rear view of a reversing mechanism.
Figure 6:
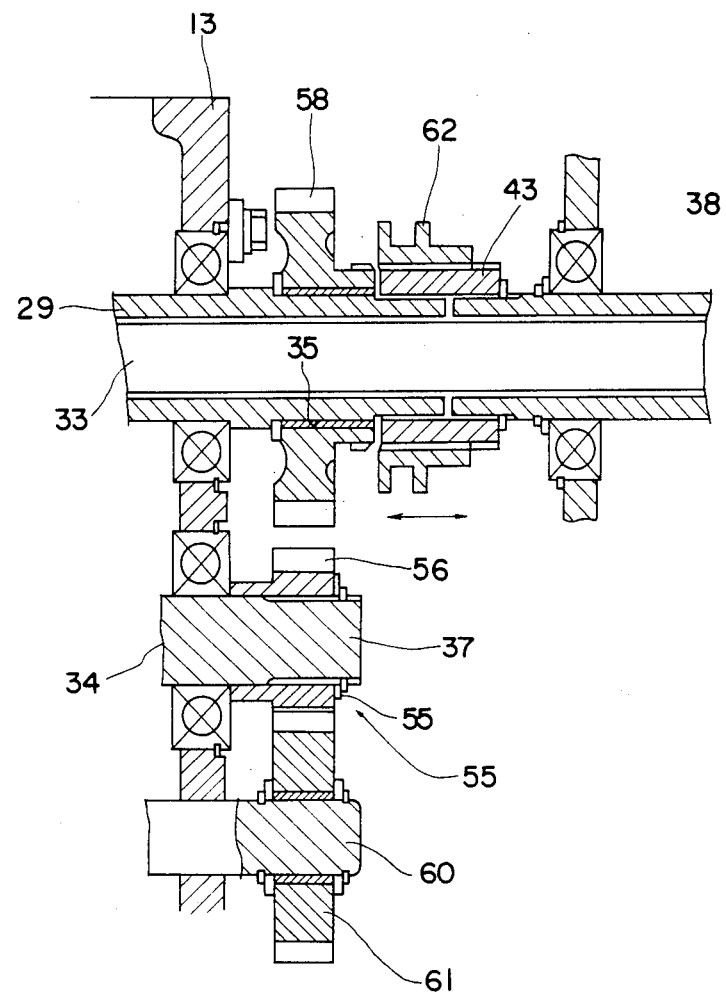
FIG. 6 is a developed sectional view of FIG. 5.

Referring to FIGS. 5 and 6, the reversing mechanism 55 includes a gear 56 mounted on the projecting portion 37 and stopped by a collar 57 or the like from coming off, and a back gear 58 rotatably mounted on the projecting portion 35, the two gears 56 and 58 being operatively connected to each other through an intermediate gear 61 on a shaft 60 supported by arm means 59 projecting from a lateral wall of the transmission case 16. The coupler 43 has a splined outer periphery on which a shifter 62 is slidably mounted to bring the reversing mechanism 55 into and out of operation.

In FIG. 5, number 63 denotes a shift lever for a first and a second speed, number 64 denotes a shift lever for a third and a fourth speed, and number 65 denotes a shift lever for backing, the shift levers having their respective shift forks 66, 67 and 68. The shift levers 63, 64 and 65 are selectively engaged by an engaging element 70 attached to a transversely slidable selector bar 69. Speed changes are effected through a selecting operation and a shifting operation of a single lever 71 connected to the selector bar 69.

In the transmission shown in FIG. 4, the primary change speed mechanism 15 is provided with the high and low transmission mechanism 48 to switch between a high speed and a low speed, to which the differential 17 is operatively connected through the primary change speed mechanism 15 and the secondary change speed mechanism 18, and the reversing mechanism 56 is adapted to provide one backward speed. The primary change speed mechanism 15 shown in FIG. 2 is used intact in this embodiment.

Number 72 in FIGS. 2 and 4 denotes a transmission shaft for driving the front wheels, which extends from the second transmission case through the first transmission case in parallel with the other shafts and includes a clutch 73 at an intermediate position thereof to establish and break power transmission. This transmission shaft 72 carries a gear 74 in mesh with the drive gear 44, and has a front power takeoff mechanism 75 at a forward end thereof. The power takeoff mechanism 75 operatively connects the transmission shaft 72 to the propeller shaft 4. The power takeoff mechanism 75 is contained in a recess 76 defined in a bottom portion of the clutch housing 8, the recess 76 being closed by a case 77.

As seen, this invention provides a transmission in which the output of the engine 5 is transmitted through the clutch mechanism 9 to the primary change speed mechanism 15 in the first transmission case 13 and to the secondary change speed mechanism 18 in the second transmission case 16, and its characterizing features lie in that the first transmission case 13 is removably attached at the forward end thereof to the engine side and the second transmission case 16 is removably attached at the forward end thereof to the rear end of the first transmission case 13, that the casings 21 and 51 containing the different types of transmission mechanism 19 and 48 are interchangeably mounted on the input side of the primary change speed mechanism 15, that the first transmission case 13 provides the space 27 in the forward portion thereof to accommodate the casings 21 and 51, that the receiving mechanism 55 is removably mounted between the output side of the primary change speed mechanism 15 and the input side of the secondary change speed mechanism 18, and that the second transmission case provides the space 45 in the forward portion thereof to accommodate the reversing mechanism 55. This construction has the following advantages.

The transmission becomes well suited for an operation involving a frequent repetition of to and fro movements, when the shuttle transmission mechanism 19 is mounted forwardly of the primary change speed mechanism 15 and operatively connected to the second change speed mechanism 18. On the other hand, when the high speed and low speed transmission mechnaism 48 is mounted forwardly of the primary change speed mechanism 15, the reversing mechanism 55 is mounted in the space 45 defined in the second transmission case 16. At this time the same primary change speed mechanism 15 is utilized as when the shuttle transmission mechanism 19 is mounted, and besides there is no need to change the wheelbase. Therefore, transmissions according to intended purposes can be massproduced at a manufacturing plant by putting components to combined use, from which a substantial cut in manufacturing costs may be expected.

Figure 7:
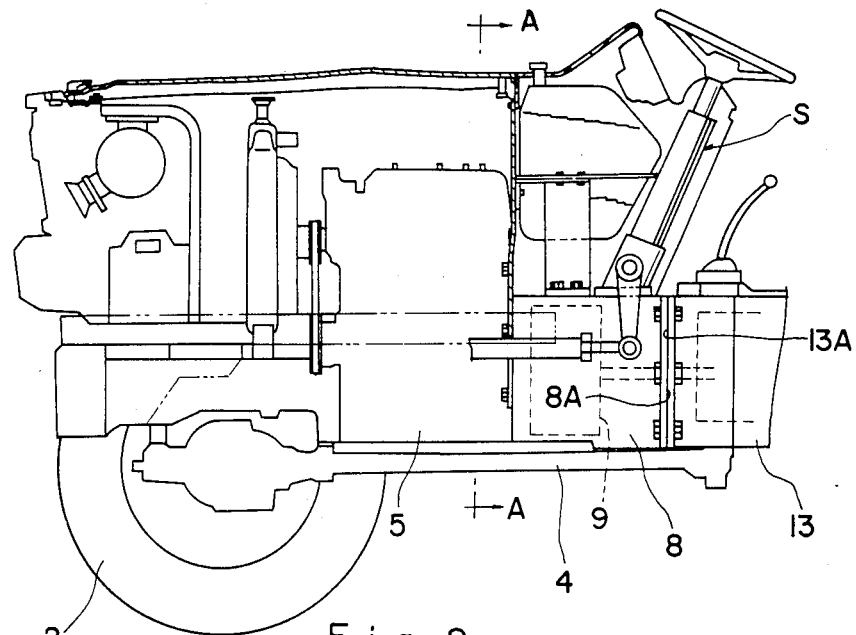
FIG. 7 is a schematic side view of a forward portion of the tractor.

Referring now to FIG. 7 showing a forward portion of the tractor, the tractor frame includes the clutch housing 8 containing the clutch mechanism 9 and connected to the engine 5. The first transmission case 13 has a forward end opening face 13A detachably connected to a rear end opening face 8A of the clutch housing 8. A steering wheel assembly S is disposed at the side of the two interconnected end opening faces 8A and 13A opposed to the engine 5.

Figure 8:
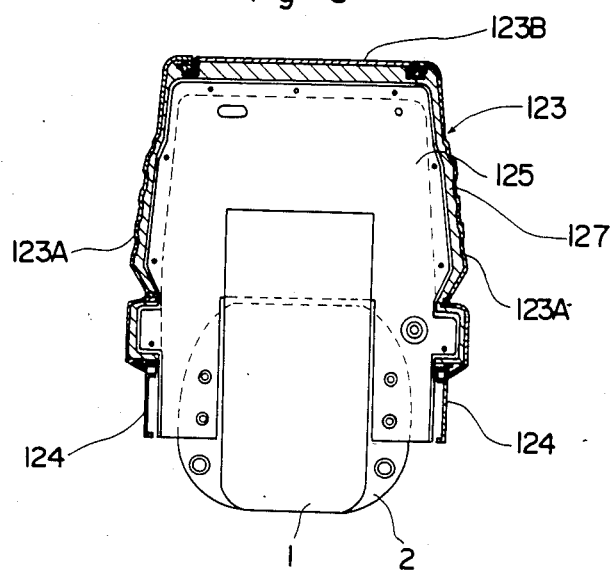
FIG. 8 is a sectional view taken on line A—A of FIG. 7.

Referring to FIG. 8 which is a section taken on line A—A of FIG. 7, number 123 denotes a bonnet comprising lateral portions 123A and a top portion 123B, the latter being adapted to open laterally. Number 124 denotes a right and left pair of frames supported by lateral walls of the clutch housing 8. Number 125 denotes a heat insulator plate. Number 127 denotes elastic packing formed of sponge, rubber or the like disposed between the frames 124 and the insulator plate 125.

The above construction has an advantage that the steering wheel assembly S need not be disassembled when the clutch housing 8 and the first transmission case 13 are separated from each other, which is frequently carried out, for maintenance of the clutch mechanism 9.

We claim:

1. A transmission for a tractor including:
   a transmission case comprising a clutch housing containing a clutch mechanism, a second transmission case, and a first transmission case removably attached from between said clutch housing and second transmission case;
   a primary speed change mechanism housed in said first transmission case, said primary speed change mechanism being operatively connected through a speed change shaft to a secondary speed change mechanism housed in said second transmission case, said speed change shaft comprising a first shaft and a second shaft connected thereto by means of a first coupler, said first coupler arranged in the second transmission case forwardly of said secondary speed change mechanism;
   a backward and forward switching mechanism operatively connected to said engine through the clutch mechanism and to said primary speed change mechanism through an intermediate shaft and adapted to be supported by a supporting member removably mounted in a forward portion of said first transmission case;
   said intermediate shaft comprising a first intermediate shaft and a second intermediate shaft connected thereto by means of a second coupler, said second coupler arranged between said backward and forward switching and primary speed change mechanisms, said first intermediate shaft supported by said supporting member, said second intermediate shaft supported by the first transmission case and having a portion projecting into the second transmission case, said projecting portion being adapted to mount a reversing mechanism for operatively connecting said second intermediate shaft with said first shaft of said speed change shaft.

2. A transmission as set forth in claim 1 wherein:
   said projecting portion of said intermediate shaft includes a spline for mounting a reverse gear.

3. A transmission as set forth in claim 1 wherein:
   said clutch housing has a bottom defining a recess receiving a front power takeoff mechanism to take out power from the secondary change speed mechanism.

4. A transmission as set forth in claim 3 wherein:
   said clutch housing has a flywheel housing removably attached thereto.

* * * * *